US012728860B2

(12) United States Patent
Suh et al.

(10) Patent No.: US 12,728,860 B2
(45) Date of Patent: Sep. 8, 2026

(54) METHOD AND DEVICE FOR CONTROLLING VEHICLE

(71) Applicants: Hyundai Motor Company, Seoul (KR); Kia Corporation, Seoul (KR)

(72) Inventors: Jung Seok Suh, Yongin-si (KR); Bon Hyoung Goo, Incheon (KR); Yu Na Lee, Suwon-si (KR); Kyu Beom Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 59 days.

(21) Appl. No.: 18/816,175

(22) Filed: Aug. 27, 2024

(65) Prior Publication Data

US 2025/0187601 A1 Jun. 12, 2025

(30) Foreign Application Priority Data

Dec. 11, 2023 (KR) ........................ 10-2023-0178694

(51) Int. Cl.
*B60W 30/18* (2012.01)
*B60W 50/14* (2020.01)
*B60W 60/00* (2020.01)

(52) U.S. Cl.
CPC ...... *B60W 30/18163* (2013.01); *B60W 50/14* (2013.01); *B60W 60/001* (2020.02); *B60W 2050/146* (2013.01); *B60W 2554/4045* (2020.02); *B60W 2554/4046* (2020.02)

(58) Field of Classification Search
CPC ............................................... B60W 30/18163
See application file for complete search history.

(56) References Cited

U.S. PATENT DOCUMENTS

| | | | | |
|---|---|---|---|---|
| 10,239,528 | B2 * | 3/2019 | Oh | B60W 30/08 |
| 10,351,137 | B2 * | 7/2019 | Shin | B60W 30/18163 |
| 12,472,945 | B2 * | 11/2025 | Hempel | B60W 30/146 |
| 12,482,353 | B1 * | 11/2025 | Baumgartner | G08G 1/096725 |
| 2021/0171064 | A1 * | 6/2021 | Mimura | B60Q 1/545 |
| 2025/0187601 | A1 * | 6/2025 | Suh | B60W 30/18163 |

FOREIGN PATENT DOCUMENTS

| | | | |
|---|---|---|---|
| JP | 6143037 | B1 | 6/2017 |
| JP | 2022121183 | A | 8/2022 |
| KR | 20170049948 | A | 5/2017 |
| KR | 20220076902 | A | 6/2022 |

* cited by examiner

*Primary Examiner* — Michael A Berns
(74) *Attorney, Agent, or Firm* — Slater Matsil, LLP

(57) ABSTRACT

An embodiment vehicle control device includes one or more processors and a non-transitory storage device storing a program to be executed by the one or more processors, the program including instructions to receive information for determination, determine, based on the received information, whether an overtaking condition is satisfied, whether yielding is possible, whether there is an oncoming vehicle, or whether a rear vehicle attempts to overtake a vehicle, control a display device to output content determined based on a determination result for providing a front situation and a vehicle control state to the rear vehicle and an occupant of the vehicle, and control a maneuver of the vehicle based on the determination result.

20 Claims, 11 Drawing Sheets

METHOD AND DEVICE FOR CONTROLLING VEHICLE

CROSS-REFERENCE TO RELATED APPLICATIONS

The present application claims the benefit of Korean Patent Application No. 10-2023-0178694, filed on Dec. 11, 2023, which application is hereby incorporated herein by reference.

TECHNICAL FIELD

The present disclosure relates to a method and a device for controlling a vehicle.

BACKGROUND

The content described in this section simply provides background information for the present disclosure and does not constitute related art.

A rear vehicle may overtake a front vehicle on a narrow road such as a two-lane two-way road. For example, an ambulance or fire truck may need to overtake. In this case, since there is no extra lane for yielding or overtaking, the rear vehicle must cross a center line and attempt to overtake. Since a field of view of the rear vehicle is limited by the front vehicle, the rear vehicle may not see an oncoming vehicle, causing an accident. Accordingly, it is necessary to inform a rear vehicle attempting to overtake of information on the front side.

The front vehicle may recognize a rear vehicle and provide information on the front situation to the rear vehicle to inform. For example, the front vehicle may provide a warning or guidance (e.g., guidance on alternative routes) to the rear vehicle while maintaining a lane.

Meanwhile, for example, when it is easier to overtake in front of a certain distance, or when there is a point at which the front vehicle can yield, a dangerous overtaking situation can be prevented from occurring. In order to prevent accidents due to overtaking, it is necessary to inform the rear vehicle that smooth traffic is possible soon without reckless overtaking, such as crossing a center line.

SUMMARY

The present disclosure relates to a method and a device for controlling a vehicle. Particular embodiments relate to a vehicle control method and device for recognizing whether or not a rear vehicle has an intention to overtake.

Embodiments of the present disclosure provide a rear vehicle with information on points at which the rear vehicle can yield or overtake by using content displayed on a screen.

According to an embodiment of the present disclosure, a vehicle control device comprises a memory configured to store instructions and at least one processor. The at least one processor executes the instructions to receive information for determination, to determine, based on the received information, one or more of whether an overtaking condition is satisfied, whether yielding is possible, whether there is an oncoming vehicle, and whether a rear vehicle attempts to overtake, to control a display unit to output content, which is determined based on the a determination result, for providing a front situation and a vehicle control state to rear vehicles and an occupant of the vehicle, and to control a maneuver of the vehicle based on the determination result.

According to another embodiment of the present disclosure, a method of controlling a vehicle in a vehicle control device includes receiving information for determination, determining, based on the received information, one or more of whether an overtaking condition is satisfied, whether yielding is possible, whether there is an oncoming vehicle, and whether a rear vehicle attempts to overtake, displaying content, which is determined based on a determination result, for providing a front situation and a vehicle control state to a rear vehicle and an occupant of the vehicle on the screen, and controlling the vehicle based on the determination result.

According to an embodiment of the present disclosure, it is possible to provide the rear vehicle with information on points at which the rear vehicle can yield or overtake by determining the overtaking intention of the rear vehicle step by step.

DETAILED DESCRIPTION OF ILLUSTRATIVE EMBODIMENTS

Figure 1:
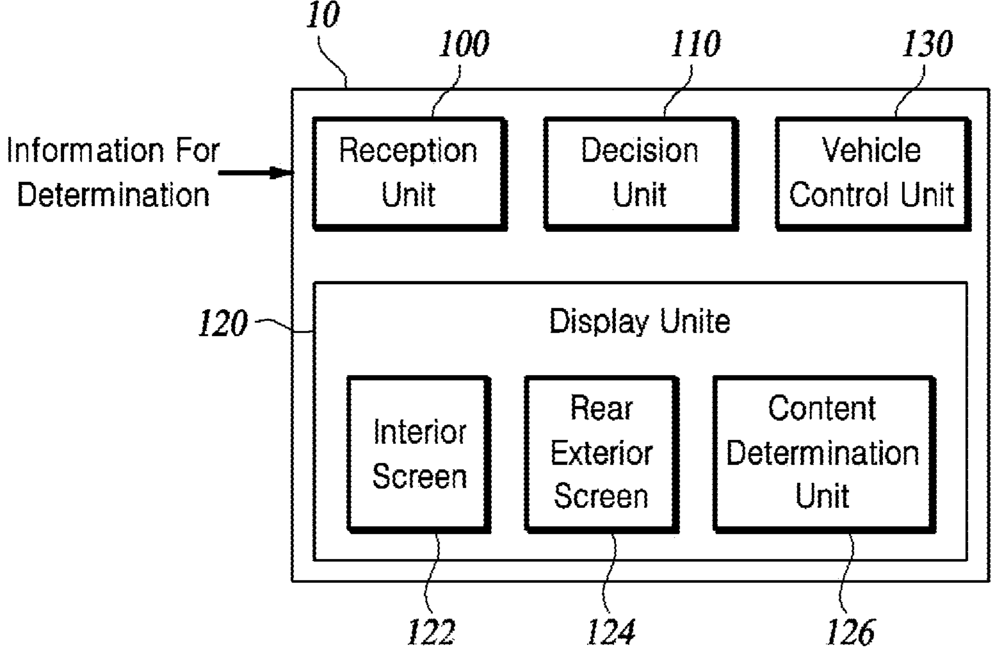
FIG. 1 is a block diagram schematically illustrating a vehicle control device according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc. are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

Singular terms used below may include plural terms unless otherwise specified.

In the present specification, an ego vehicle refers to a vehicle having a vehicle control device mounted thereon. The ego vehicle is, for example, an autonomous vehicle with an autonomous driving level of any one of 3 to 5. An oncoming vehicle refers to a vehicle of which a traveling direction is opposite to that of the ego vehicle. The rear vehicle refers to a vehicle located behind the ego vehicle and having the same traveling direction as the ego vehicle. Here, the rear refers to a rear side in the traveling direction of the ego vehicle.

FIG. 1 is a block configuration diagram schematically illustrating a vehicle control device according to an embodiment of the present disclosure.

A vehicle control device 10 according to an embodiment of the present disclosure may include all or some of a reception unit 100, a decision unit 110, a display unit 120, and a vehicle control unit 130.

The reception unit 100 may receive information for determination. Here, the information for determination may include sensor information, a high definition map, GPS signals, or the like.

The reception unit 100 may receive sensor information. Here, the sensor information may be obtained from one or more sensors. The sensors may include at least one of a camera, a LiDAR, and a radar. An ego vehicle may include at least one sensor of the same type corresponding to each direction. For example, the ego vehicle may include a front camera, a rear camera, a left camera, and/or a right camera.

The reception unit 100 may receive the sensor information from the one or more sensors, combine the sensor information, recognize an object surrounding the ego vehicle, and generate information on the object. The object, for example, may be another vehicle, a pedestrian, a road, an obstacle, or a line. The information on the object may include information for describing the object. For example, information on the other vehicle includes at least one of a speed, acceleration, and traveling direction of the other vehicle, and a distance between the other vehicle and the ego vehicle. As another example, information on the road includes at least one piece of information such as whether a road on which the ego vehicle is currently traveling is a highway, a curvature of the road, and a slope of the road.

The reception unit 100 may receive the high definition map. The reception unit 100 may receive the high definition map from a server, a storage, or a memory. The reception unit 100 may receive the GPS signals to perform positioning.

The decision unit 110 may determine whether or not the rear vehicle has the intention to overtake on the basis of received information.

The decision unit 110 may determine whether or not at least one overtaking condition is satisfied. According to an embodiment of the present disclosure, the overtaking condition includes at least one of a road condition, an approach condition, an intention condition, and a risk condition.

The decision unit 110 may determine whether or not the road on which the ego vehicle is currently traveling satisfies the road condition. Here, the road condition may include a criterion satisfied by a road with one traveling lane. For example, a two-lane two-way road, a three-lane two-way road, and a road with one or more lanes under construction may meet the road condition. Here, the three-lane two-way road may refer to a road with one lane in a traveling direction of the ego vehicle and two lanes in an opposite direction.

In the case of the two-lane two-way road, a rear vehicle behind the ego vehicle must overtake in order to go ahead of the ego vehicle. As another example, for the four-lane two-way road or two-lane one-way road, when another lane in the same direction as the driving lane is under construction, a rear vehicle must overtake in order to go ahead of the ego vehicle.

According to an embodiment of the present disclosure, the decision unit 110 may decide that the road condition is satisfied when the road has two lanes. According to another embodiment of the present disclosure, the decision unit 110 may decide that the road condition is satisfied when the road has more than two lanes but there is only one accessible lane. For example, when construction is in progress in one lane of a four-lane two-way road, vehicles traveling in a corresponding direction travel using only one lane. A rear vehicle must overtake in order to go ahead of the ego vehicle.

The decision unit 110 may determine whether or not the road condition is satisfied on the basis of the sensor information. For example, the decision unit 110 may recognize lanes, decide the number of lanes on the road, and determine whether or not the road condition is satisfied on the basis of the number of lanes. As another example, the decision unit 110 may recognize a construction sign using a camera and determine whether or not the road condition is satisfied on the basis of the construction sign. As another example, the decision unit 110 may perform positioning using a GPS and determine whether or not the road condition of the road on which the vehicle is traveling is satisfied from the high definition map or a map included in a navigation. The decision unit 110 according to an embodiment of the present disclosure may combine one or more sensor information and determine whether or not the road condition is satisfied on the basis of combined information.

The decision unit 110 may determine whether or not the rear vehicle satisfies the approach condition. Here, the approach condition may include a criterion satisfied by the rear vehicle approaching the ego vehicle. When the approach condition is satisfied, the decision unit 110 may decide that the rear vehicle is likely to have the overtaking intension.

According to an embodiment of the present disclosure, the decision unit 110 may decide that the approach condition is satisfied when the distance between the rear vehicle and the ego vehicle is shorter than the preset specific distance. On the other hand, the decision unit 110 may decide that the approach condition is satisfied when a situation in which the distance between the rear vehicle and the ego vehicle is shorter than the preset specific distance continues for the preset specific time. When the rear vehicle continues to travel toward the ego vehicle, the rear vehicle is likely to be in a situation in which the rear vehicle cannot travel at a desired speed due to the ego vehicle. That is, the rear vehicle is likely to have the intention to overtake.

According to another embodiment of the present disclosure, the decision unit 110 may decide that the approach condition is satisfied when a state in which high beams of the rear vehicle are turned on continues for a preset specific time.

According to another embodiment of the present disclosure, the decision unit 110 may decide that the approach condition is satisfied when the rear vehicle has activated an emergency light or activates a siren. When the rear vehicle has activated the emergency light or siren, it can be decided that the rear vehicle has a strong intention to overtake because the rear vehicle is an emergency vehicle.

In addition, the decision unit 110 may determine whether or not the approach condition is satisfied by additionally considering whether or not a preceding vehicle is present within a preset specific distance. In other words, even when the rear vehicle maintains a distance shorter than the preset specific distance from the ego vehicle, the decision unit 110 decides that the approach condition is not satisfied if the preceding vehicle is present within the preset specific distance from the ego vehicle.

Since the rear vehicle cannot attempt to overtake when the preceding vehicle is present within the specific distance from the ego vehicle, the decision unit 110 decides that the approach condition is not satisfied.

The decision unit 110 may determine whether or not the rear vehicle satisfies the intention condition. The intention condition is a condition for determining whether the rear vehicle currently intends to overtake.

The decision unit 110 may decide that the intention condition is satisfied when the rear vehicle does not travel at a center of the lane but performs biased traveling to the left or right of the lane for a preset specific time or more. For example, in the case of a right-hand drive country, a rear vehicle performs overtaking to the left. When the rear vehicle performs continuous biased traveling to the left, the decision unit 110 may decide that the rear vehicle has the intention to overtake. As another example, the decision unit 110 may decide that the intention condition is satisfied when the rear vehicle partially violates a center line.

The decision unit 110 may decide that the intention condition is satisfied when an acceleration of the rear vehicle is positive. That is, when the rear vehicle accelerates, the decision unit 110 decides that the intention condition is satisfied. When the road condition is satisfied, the acceleration of the rear vehicle may be decided to intend to overtake.

The decision unit 110 may determine whether or not the risk condition is satisfied. The risk condition is a condition for determining whether or not there is a risk of collision between the vehicles when the rear vehicle overtakes.

The decision unit 110 may determine whether or not an oncoming vehicle is present within a preset specific distance from the ego vehicle. The decision unit 110 may decide that the risk condition is satisfied when the oncoming vehicle is present within the preset specific distance from the ego vehicle. When the oncoming vehicle is present within a certain distance from the ego vehicle, there is a risk that a rear vehicle will collide with the oncoming vehicle when the rear vehicle overtakes. Therefore, it is necessary to inform the rear vehicle that the oncoming vehicle is present within the certain distance and there is a risk of collision when the rear vehicle overtakes.

The decision unit 110 may decide that the risk condition is satisfied when a curved road satisfying a specific condition is present within the preset specific distance from the ego vehicle. According to an embodiment of the present disclosure, when a curvature of a road ahead is greater than a specific value, the decision unit 110 may decide that the risk condition is satisfied. According to another embodiment of the present disclosure, when a continuous curve is present on the road ahead, the decision unit 110 may decide that the risk condition is satisfied.

When there is a curved road with a curvature greater than a specific value within the certain distance from the ego vehicle, that is, a sharp curve or a continuous curve, the ego vehicle may not be able to recognize an oncoming vehicle even when the oncoming vehicle is close enough. Therefore, it is necessary to inform the rear vehicle attempting to overtake that there is a risk of collision when the rear vehicle overtakes. Alternatively, when there is the continuous curve when the rear vehicle rapidly accelerates to overtake, there is a risk of an accident for the rear vehicle. Therefore, it is necessary to inform the rear vehicle attempting to overtake that there is the continuous curve or sharp curve at the time of overtaking.

The decision unit 110 may determine whether the rear vehicle is overtaking. The decision unit 110 may determine whether the rear vehicle is overtaking on the basis of the position of the rear vehicle. On the other hand, the decision unit 110 may determine whether the rear vehicle is overtaking on the basis of a speed of the rear vehicle.

The decision unit 110 may determine whether or not the ego vehicle can yield on the basis of the current position of the vehicle. For example, when the number of lanes increases a certain distance ahead of the ego vehicle, the decision unit 110 may decide that yielding is possible after the certain distance. As another example, when a construction section ends the certain distance ahead of the ego vehicle, the decision unit 110 may decide that the yielding is possible after the certain distance.

The display unit 120 may include a screen and a content determination unit 126. The display unit 120 may include at least one screen. Each screen may be a screen for an occupant of the ego vehicle (hereinafter referred to as an 'interior screen') 122 or a screen for a rear vehicle (hereinafter referred to as a 'rear exterior screen') 124. The interior screen 122 is located inside the ego vehicle and is a screen for showing a control intention of the ego vehicle to the occupant and guidance matters to the rear vehicle. The rear exterior screen 124 is a screen for informing the rear vehicle of a state of the ego vehicle, a traveling intention of the ego vehicle, a road condition, the presence of an oncoming vehicle, and a distance to the oncoming vehicle. At least one interior screen 122 is present inside the vehicle. At least one rear exterior screen 124 is present inside or outside the vehicle.

The content determination unit 126 may determine content to be displayed on the screen on the basis of the decision of the decision unit 110 and control the screen to display the determined content.

The screen may display the content under control of the content determination unit 126. Here, the content may include one or more images and text. According to an embodiment of the present disclosure, the content determination unit 126 may control the screens so that different pieces of content are displayed on the respective screens. For example, the rear exterior screen 124 may display text for providing information to the rear vehicle, and the interior screen 122 may display text indicating that the text for providing information to the rear vehicle is being displayed.

The display unit 120 may control the screen so that the content is displayed on the basis of the decision of the decision unit 110. Here, the decision of the decision unit 110 may include whether or not yielding is possible and whether or not the rear vehicle is overtaking, in addition to whether the overtaking condition is satisfied. Hereinafter, the content to be displayed on the screen depending on the decision of each decision unit 110 will be described in detail with reference to the drawings.

FIG. 2A to FIG. 2F are illustrative diagrams illustrating various examples of content.

Figure 2A:
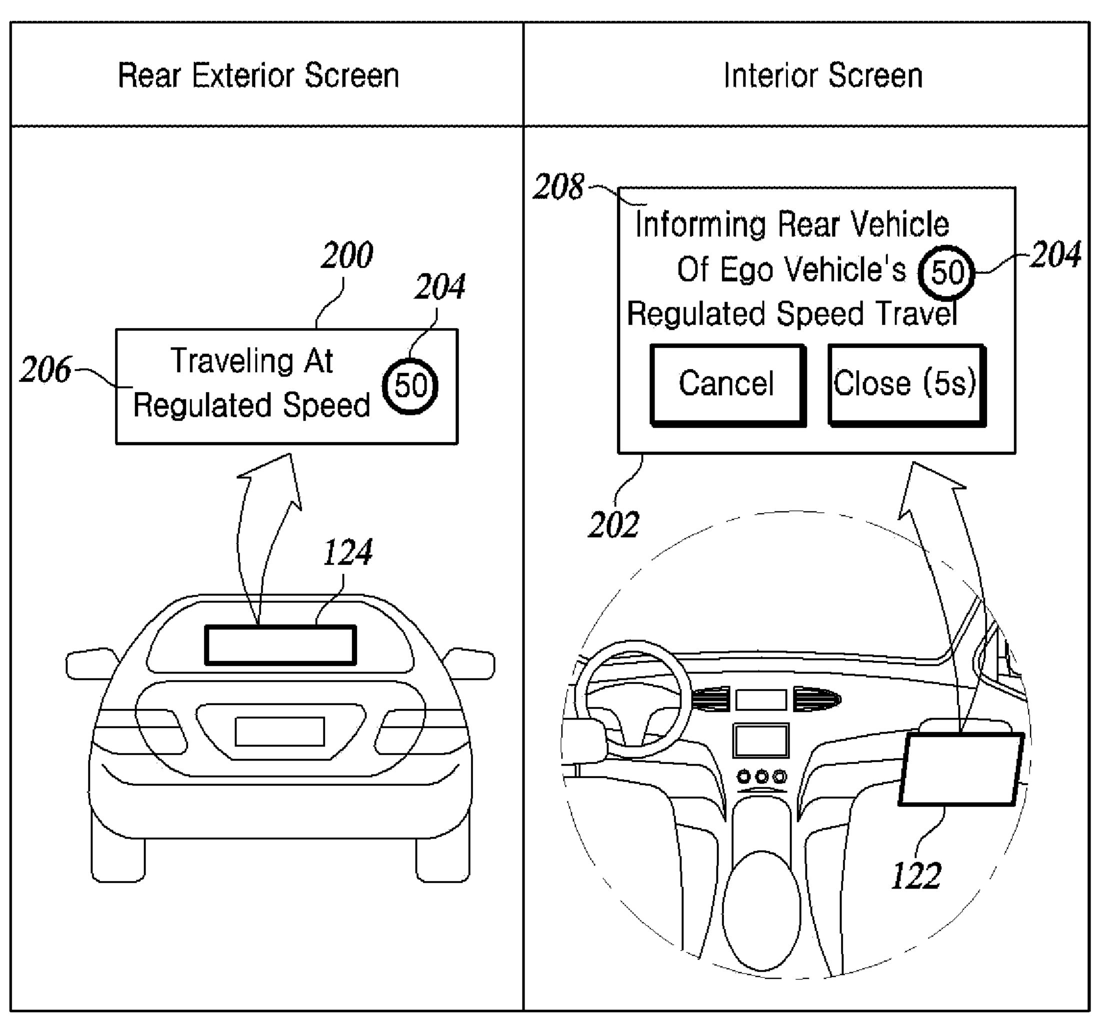
FIG. 2A to FIG. 2F are illustrative diagrams illustrating various examples of content.

Referring to FIG. 2A, when the road condition and the approach condition are satisfied, the display unit 120 may display first content 200 and 202 on the screens. The first content 200 and 202 may include a speed limit image 204 for a road on which the ego vehicle is currently located. The first content 200 and 202 may include text 206 and 208 indicating that the ego vehicle is traveling at a constant speed. The text 206 indicating that the vehicle is driving at a constant speed, which is displayed on the rear exterior screen 124 may read 'Traveling at regulated speed.' The text 208 indicating that the vehicle is driving at a constant speed, which is displayed on the interior screen 122, may be 'Informing rear vehicle of ego vehicle's regulated speed travel.' That is, the ego vehicle may provide, by displaying the first content 200 and 202, information on a current speed of the ego vehicle or the speed limit of the road to the occupant and/or the rear vehicle.

Figure 2B:
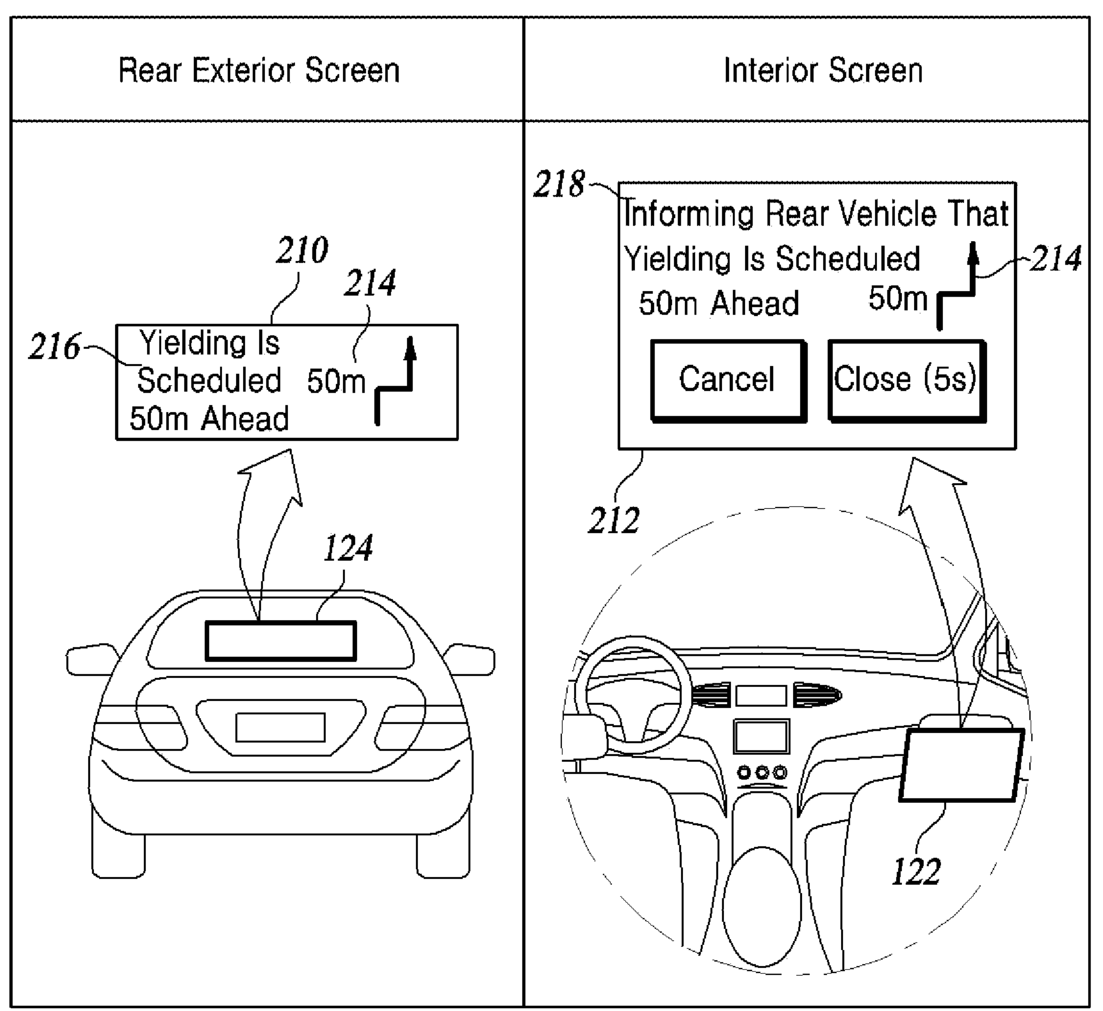

Referring to FIG. 2B, when the road condition, the approach condition, and the intention condition are satisfied and the yielding is possible, the display unit 120 may display second content 210 and 212 on the screens. According to an embodiment of the present disclosure, the second content 210 and 212 include an image 214 and text 216 and 218 indicating a distance to a point at which yielding is possible and indicating that yielding is scheduled. Text 216 indicating the yielding is scheduled, which is displayed on the rear exterior screen 124, may be, for example, 'yielding is scheduled 50 m ahead'. Text 218 indicating that yielding is scheduled, which is displayed on the interior screen 122, may be, for example, 'Informing rear vehicle that yielding is scheduled 50 m ahead.'

Figure 2C:
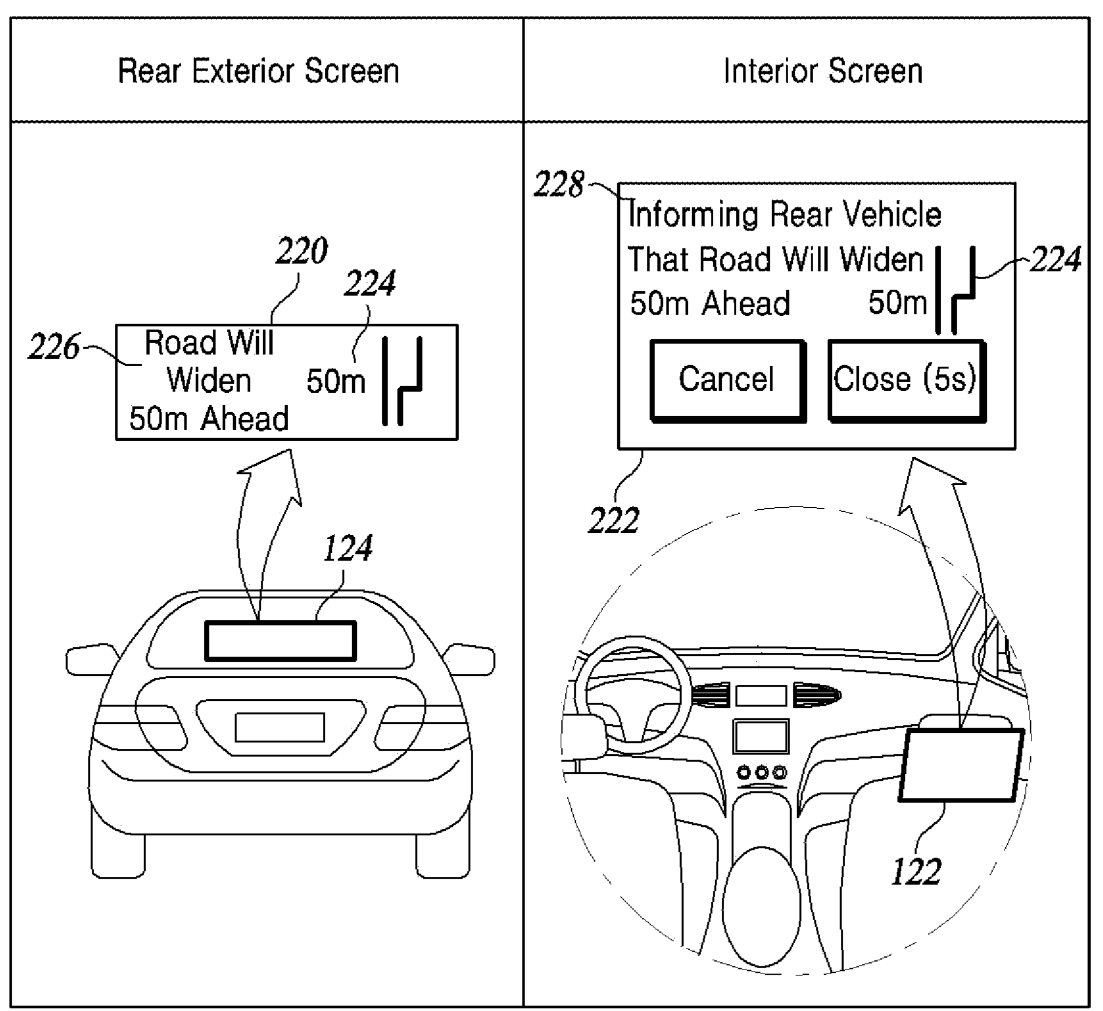

Additionally or alternatively, referring to FIG. 2C, the second content 220 and 222 may include an image 224 and text 226 and 228 indicating a distance to a point at which the road widens and indicating that the road is going to widen. Text 226 indicating that the road is going to widen, which is displayed on the rear exterior screen 124, may be 'Road will widen 50 m ahead.' The text 228 indicating that the road is going to widen, which is displayed on the interior screen 122, may be 'Informing rear vehicle that road will widen 50 m ahead.' That is, the ego vehicle may provide, by displaying the second content 210, 212, 220, and 222, information on a location ahead where yielding by the ego vehicle or overtaking by the rear vehicle is facilitated to the occupant and/or the rear vehicle.

A distance to the point at which yielding is possible or a distance to the point at which the road widens included in the second content 210, 212, 220, and 222 may be changed depending on a distance between the ego vehicle and the point. For example, when a distance between the ego vehicle and the point at which yielding is possible is reduced from 50 m to 30 m, the display unit 120 changes the distance to the point at which yielding is possible from '50 m' to '30 m' and displays the distance on the screens 122 and 124.

If yielding is not possible even when the road condition, the approach condition, and the intention condition are satisfied, the display unit 120 may display the first content 200 and 202 on the screens 122 and 124.

Figure 2D:
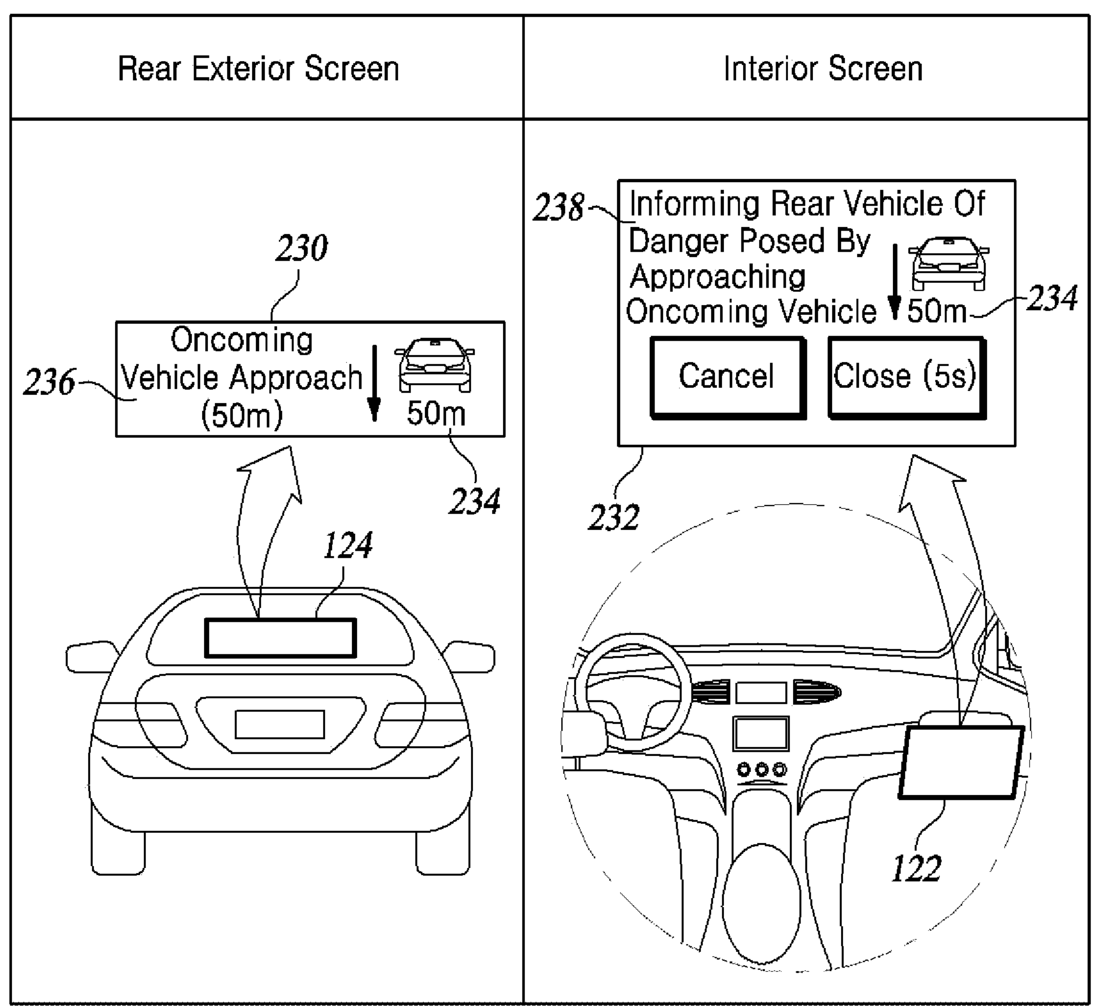
Figure 2E:
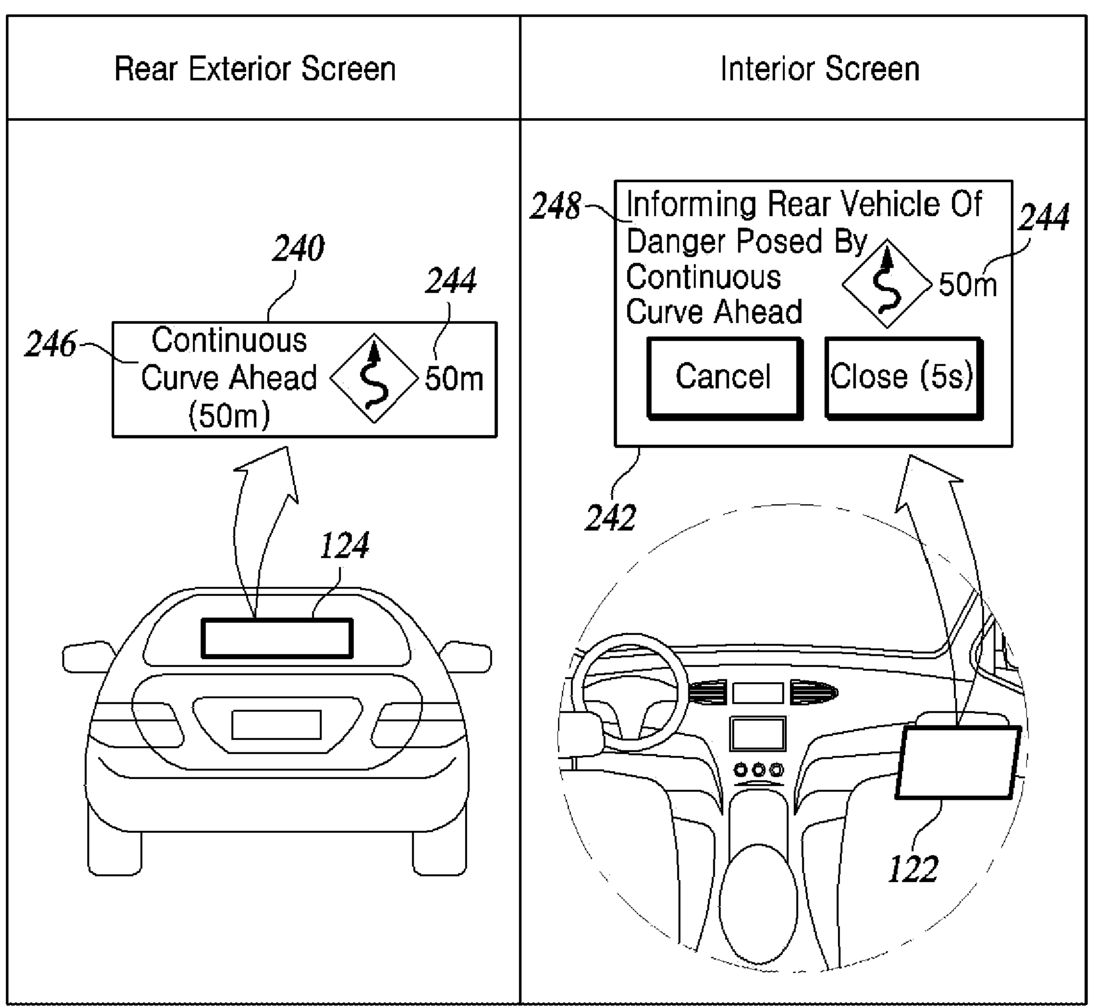

Referring to FIGS. 2D and 2E, when the road condition, the approach condition, the intention condition, and the risk condition are satisfied, the display unit 120 may display third content 230, 232, 240, and 242 on the screens. The third content 230, 232, 240, and 242 is content for informing the rear vehicle of danger.

According to an embodiment of the present disclosure, the display unit 120 may display third content 230 and 232 including text 236 and 238 and an image 234 indicating that the oncoming vehicle is present at a certain distance from the ego vehicle. The third content 230 and 232 includes a distance between the ego vehicle and the oncoming vehicle. The third content 230 and 232 may be changed depending on the distance between the ego vehicle and the oncoming vehicle. For example, when the distance between the ego vehicle and the oncoming vehicle is 50 m, the display unit 120 may display the third content 230 and 232 including '50 m'. Thereafter, when the distance between the ego vehicle and the oncoming vehicle is reduced to 30 m, the display unit 120 may display the third content 230 and 232 including '30 m'.

Text 236 for informing the presence of the oncoming vehicle displayed on the rear exterior screen 124 may be, for example, 'Oncoming vehicle approach (50 m).' Text 238 for informing the presence of the oncoming vehicle displayed on the interior screen 122 may be, for example, 'Informing rear vehicle of danger posed by approaching oncoming vehicle.'

According to another embodiment of the present disclosure, the display unit 120 may display third content 240 and 242 including text 246 and 248 and an image 244 for informing that a continuous curve is present ahead. The third content 240 and 242 includes a distance between the ego vehicle and the starting point of the continuous curve. The third content 240 and 242 may be changed depending on the distance between the ego vehicle and the starting point of the continuous curve. For example, when the distance between the ego vehicle and the starting point of the continuous curve is 50 m, the display unit 120 may display third content 240 and 242 including '50 m.' Thereafter, when the distance between the ego vehicle and the starting point of the continuous curve is reduced to 30 m, the display unit 120 displays third content 240 and 242 including '30 m.'

Text 246 for indicating that a continuous curve is present ahead, which is displayed on the rear exterior screen 124, may be, for example, 'Continuous curve ahead (50 m).' Text 248 for informing the continuous curve is present ahead, which is displayed on the interior screen 122, may be, for example, 'Informing rear vehicle of danger posed by continuous curve ahead.'

Figure 2F:
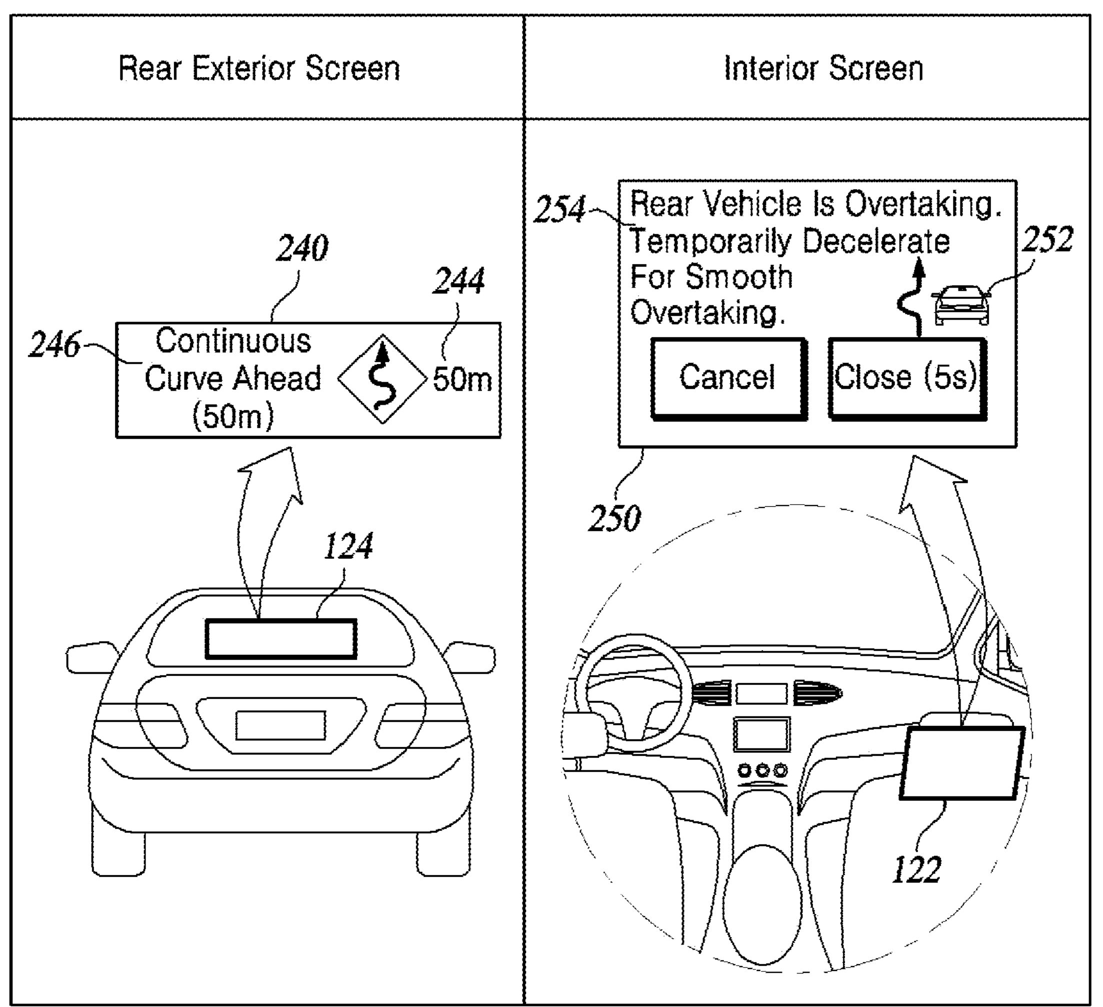

Referring to FIG. 2F, when the road condition, the approach condition, and the intention condition are satisfied and the rear vehicle is overtaking, the display unit 120 may display fourth content 250 on the screen. According to an embodiment of the present disclosure, the fourth content 250 is displayed only on the interior screen 122 and not on the rear exterior screen 124, unlike the first to third content. When the fourth content 250 is displayed only on the interior screen 122, the rear exterior screen 124 displays the first content 200, the second content 210 or 220, or the third content 230 or 240. For example, the rear exterior screen 124 may maintain content that was displayed before the rear vehicle initiated overtaking. The fourth content 250 is content for informing that the rear vehicle is overtaking. The fourth content 250 includes an image 252 and text 254 for informing that the rear vehicle is overtaking and a control state of the ego vehicle.

The text 254 for informing that the rear vehicle is overtaking and the control state of the ego vehicle may be, for example, 'Rear vehicle is overtaking. Temporarily decelerate for smooth overtaking.'

The display unit 120 may determine the target content on the basis of the decision of the decision unit 110. The target content is content determined to be displayed on the screen at a current point in time. The display unit 120 may display the content determined as target content among the first to fourth content on the screen. For example, when the road condition and the approach condition are satisfied and the yielding is possible, but the risk condition is not satisfied, the target content is the second content. The display unit 120 displays the determined target content on the interior screen 122 and the rear exterior screen 124.

The first to fourth content displayed on the interior screen 122 includes a cancel button and a close button. The close button displays time until the first to fourth pieces of content displayed on the interior screen 122 will disappear.

The interior screen 122 may be, for example, a touch screen. When an electrical signal is applied to a position of the guidance cancel button displayed on the interior screen 122, the display unit 120 may no longer display the content on the rear exterior screen 124. When an electrical signal is applied to a position of the close button displayed on the interior screen 122, the display unit 120 may no longer display the content on the interior screen 122.

The vehicle control unit 130 may control the ego vehicle on the basis of the decision of the decision unit 110. The vehicle control unit 130 may control the movement of the vehicle. For example, the vehicle control unit 130 may control the speed of the ego vehicle on the basis of the decision of the decision unit 110. As another example, the vehicle control unit 130 may control the ego vehicle so that the ego vehicle performs biased traveling within the lane on the basis of the decision of the decision unit 110. The vehicle control unit 130 may perform control so that the ego vehicle changes lanes to yield on the basis of the decision of the decision unit 110.

According to an embodiment of the present disclosure, when the road condition, the approach condition, and the intention condition are satisfied and the ego vehicle reaches the point at which yielding is possible, the vehicle control unit 130 may control the ego vehicle so that the ego vehicle changes lanes to yield. The vehicle control unit 130 may turn on a right or left turn signal and control the ego vehicle so that the ego vehicle changes lanes to yield. The vehicle control unit 130 may control the speed of the ego vehicle, in addition to changing a traveling lane.

According to another embodiment of the present disclosure, when the road condition, the approach condition, the intention condition, the risk condition, and the overtaking condition are satisfied, the vehicle control unit 130 may reduce or maintain the speed of the ego vehicle. When the rear vehicle is overtaking, there is a risk that the rear vehicle will collide with the ego vehicle or the oncoming vehicle if the ego vehicle accelerates. Accordingly, the vehicle control unit 130 may control the ego vehicle to prevent the ego vehicle from accelerating. On the other hand, the vehicle control unit 130 may accelerate the ego vehicle. The vehicle control unit 130 may accelerate the ego vehicle when there is no risk of collision with the rear vehicle even when the ego vehicle accelerates.

The vehicle control unit 130 may control the speed of the ego vehicle and control the ego vehicle so that the ego vehicle performs biased traveling. For example, the vehicle control unit 130 may control the ego vehicle so that the ego vehicle performs biased traveling to the right in a right-hand drive country and performs biased traveling to the left in a left-hand drive country.

Figure 3:
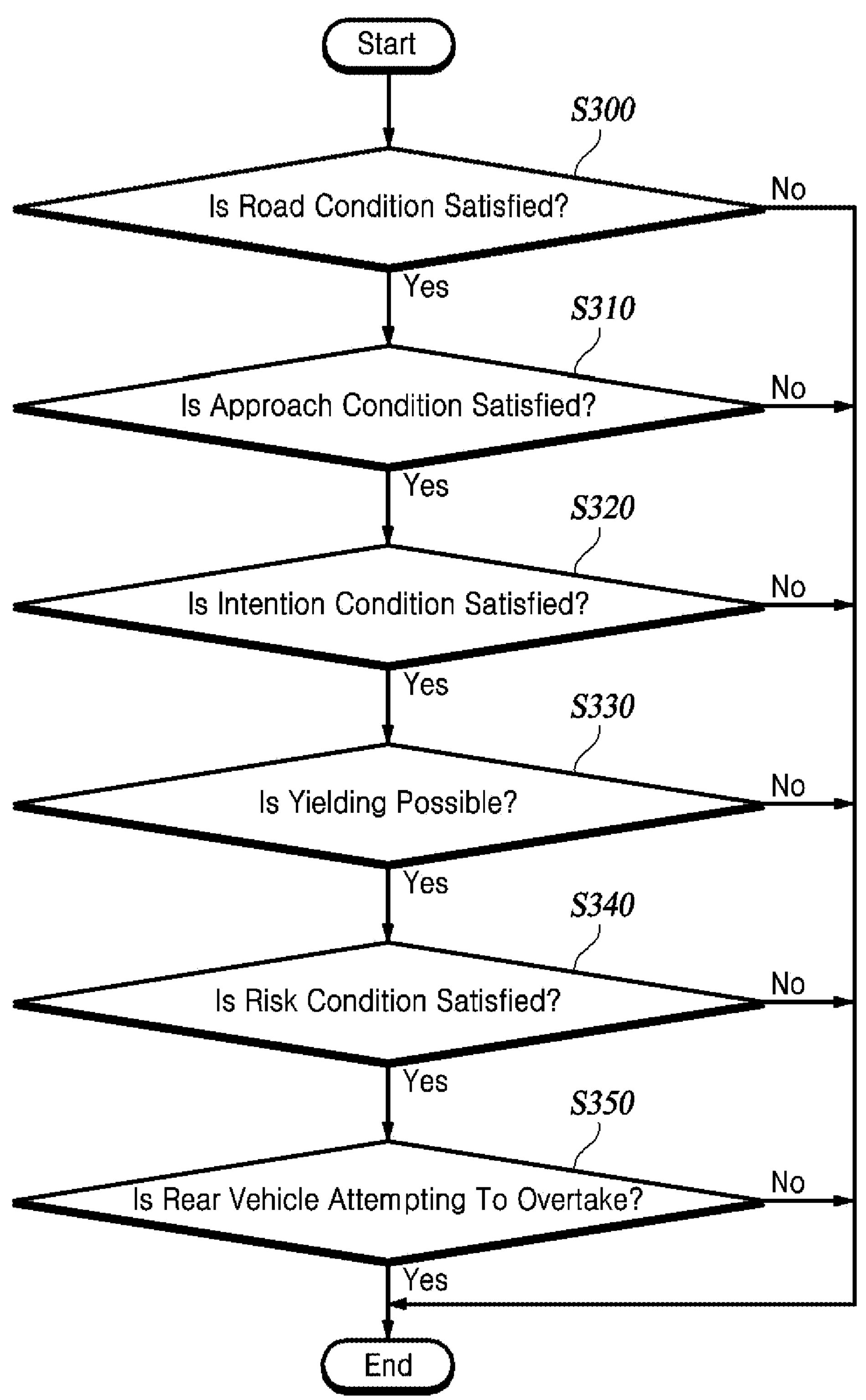
FIG. 3 is a flowchart illustrating a stepwise determination process according to an embodiment of the present disclosure.

FIG. 3 is a flowchart illustrating a stepwise determination process according to an embodiment of the present disclosure.

Referring to FIG. 3, the decision unit 110 may determine whether or not the rear vehicle has the intention to overtake on the basis of the information for decision.

The decision unit 110 may determine whether or not the road on which the ego vehicle is currently traveling satisfies the road condition (S300). A two-lane two-way road, a three-lane two-way road, and a road with one or more lanes under construction may satisfy the road condition. When the road has two lanes, the decision unit 110 may decide that the road condition is satisfied. When a road has more lanes than two lanes but vehicles can travel in only one lane, the decision unit 110 may decide that the road condition is satisfied. For example, when construction is underway on one lane of a four-lane road, the decision unit 110 may decide that the road condition is satisfied.

The decision unit 110 may determine whether or not the road condition is satisfied on the basis of the sensor information. For example, the decision unit 110 may recognize lanes to decide the number of lanes on the road and determine whether or not the road condition is satisfied on the basis of the number of lanes. As another example, the decision unit 110 may recognize a construction sign using a camera and determine whether or not the road condition is satisfied on the basis of the construction sign. As another example, the decision unit 110 may perform positioning using a GPS and determine whether or not the road condition of the road on which the vehicle is traveling is satisfied from the high definition map or the map included in the navigation. The decision unit 110 according to an embodiment of the present disclosure may combine one or more sensor information and determine whether or not the road condition is satisfied on the basis of combined information.

When the road condition is satisfied, the decision unit 110 may determine whether or not the rear vehicle satisfies the approach condition (S310). When the approach condition is satisfied, the decision unit 110 may decide that the rear vehicle is likely to have the overtaking intention. The decision unit 110 may decide that the approach condition is satisfied when the distance between the rear vehicle and the ego vehicle is shorter than the preset specific distance. On the other hand, the decision unit 110 may decide that the approach condition is satisfied when the situation in which the distance between the rear vehicle and the ego vehicle is shorter than the preset specific distance continues for the preset specific time.

According to another embodiment of the present disclosure, the decision unit 110 may decide that the approach condition is satisfied when a state in which high beams of the rear vehicle are turned on continues for a preset specific time. According to another embodiment of the present disclosure, the decision unit 110 may decide that the approach condition is satisfied when the rear vehicle has activated the emergency light or the siren. When the rear vehicle has activated the emergency light or the siren, it can be decided that the rear vehicle has a strong intention to overtake because the rear vehicle is an emergency vehicle.

Additionally or alternatively, the decision unit 110 may determine whether or not the approach condition is satisfied by additionally considering whether a preceding vehicle is present within a preset specific distance. In other words, even when the rear vehicle maintains a distance shorter than the preset specific distance from the ego vehicle, the decision unit 110 may decide that the approach condition is not satisfied if the preceding vehicle is present within the preset specific distance from the ego vehicle.

The decision unit 110 may decide that the approach condition is satisfied when the rear vehicle turns on the high beams for a specific time, the rear vehicle is located within a specific distance from the vehicle for a specific time, or the rear vehicle has activated the emergency light or the siren.

When the approach condition is satisfied, the decision unit 110 may determine whether or not the rear vehicle satisfies the intention condition (S320). The intention condition is a condition for determining whether the rear vehicle currently intends to overtake.

The decision unit 110 may decide that the intention condition is satisfied when the rear vehicle does not travel at the center of the lane but performs biased traveling to the left or right of the ego vehicle for the preset specific time or more. When the rear vehicle performs continuous biased traveling, the decision unit 110 may decide that the rear vehicle has an intention to overtake. As another example, the decision unit 110 may decide that the intention condition is satisfied when the rear vehicle partially violates the center line.

The decision unit 110 may decide that the intention condition is satisfied when the acceleration of the rear vehicle is positive. That is, when the rear vehicle accelerates, the decision unit 110 may decide that that the intention condition is satisfied. When the road condition is satisfied, the acceleration of the rear vehicle may be decided to intend to overtake.

The decision unit 110 may decide that the intention condition is satisfied when the rear vehicle does not travel at the center of the lane or the acceleration is positive.

The decision unit 110 may determine whether or not the ego vehicle can yield on the basis of the current position of the vehicle (S330). For example, when the number of lanes increases a certain distance ahead of the ego vehicle, the decision unit 110 may decide that yielding is possible after a certain distance. As another example, when a construction section ends a certain distance ahead of the ego vehicle, the decision unit 110 may decide that the yielding is possible after the certain distance.

When the intention condition is satisfied and yielding is possible, the decision unit 110 may determine whether or not the risk condition is satisfied (S340). The decision unit 110 may determine whether or not the oncoming vehicle is present within the preset specific distance from the ego vehicle. When the oncoming vehicle is present within the preset specific distance from the ego vehicle, the decision unit 110 may decide that the risk condition is satisfied.

The decision unit 110 may decide that the risk condition is satisfied when a curved road satisfying a specific condition is present within the preset specific distance from the ego vehicle. When the curvature of the road ahead is greater than the specific value, the decision unit 110 may decide that the risk condition is satisfied. On the other hand, when a continuous curve is present on the road ahead, the decision unit 110 may decide that the risk condition is satisfied.

The decision unit 110 may determine whether or not the rear vehicle is attempting to overtake (S350). The decision unit 110 may decide that the rear vehicle is overtaking on the basis of the position of the rear vehicle. On the other hand, the decision unit 110 may decide that the rear vehicle is overtaking on the basis of the speed of the rear vehicle.

Figure 4:
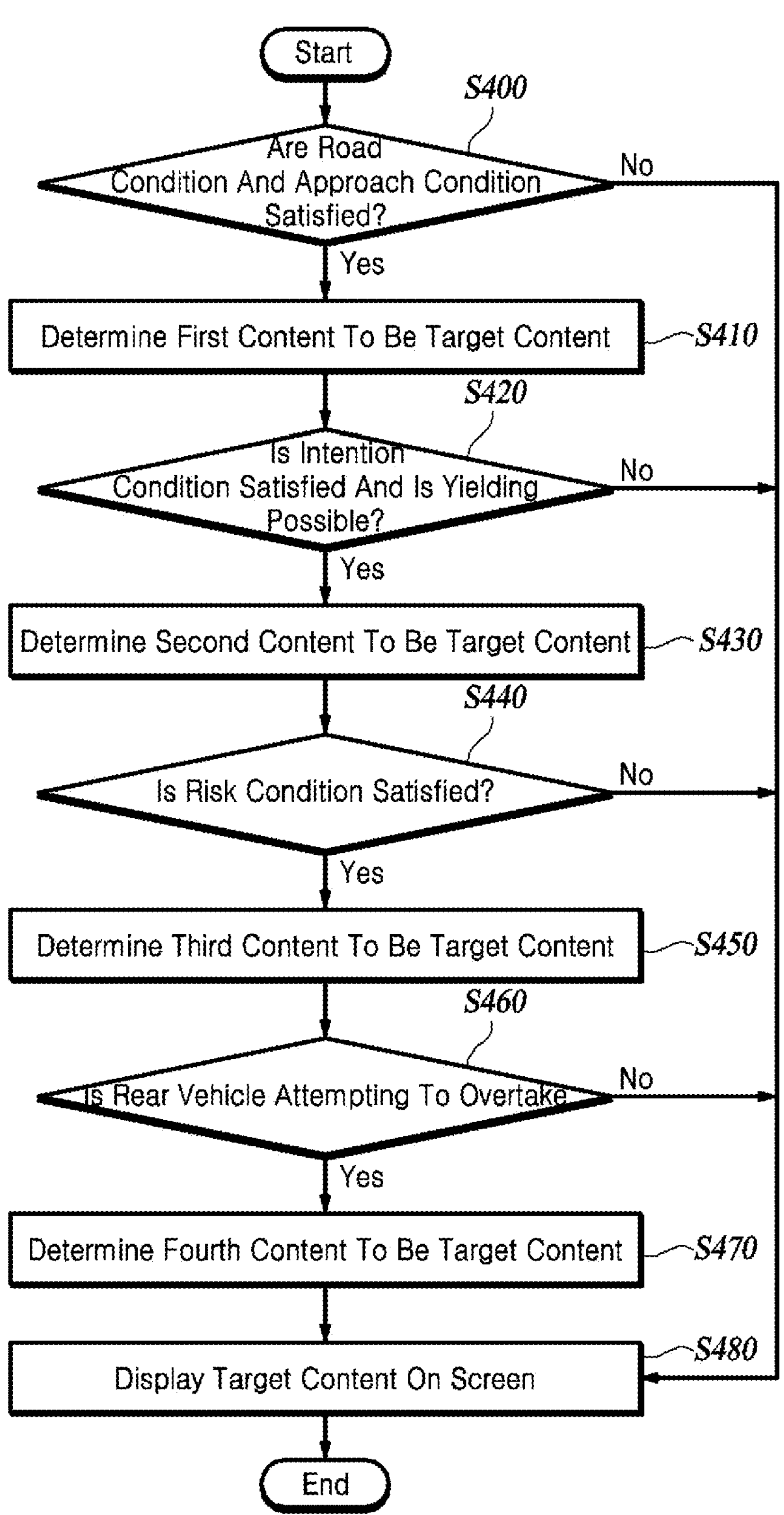
FIG. 4 is a flowchart illustrating a process of determining target content and displaying the target content on a screen according to an embodiment of the present disclosure.

FIG. 4 is a flowchart illustrating a process in which the display unit determines the target content and displays the target content on a screen according to an embodiment of the present disclosure.

Referring to FIG. 4, the decision unit 110 may determine whether or not the road condition and the approach condition are satisfied (S400). When the decision unit 110 decides that both the road condition and the approach condition are satisfied, the display unit 120 may determine the first content to be the target content (S410). Here, the first content includes an image regarding a speed limit for the road on which the vehicle is currently located and the text indicating that the vehicle is driving at a constant speed.

The decision unit 110 may determine whether or not the intention condition is satisfied and whether or not yielding is possible (S420). When the road condition, the approach condition, and the intention condition are satisfied and yielding is possible, the display unit 120 may determine the second content to be the target content (S430). Here, the second content includes an image and text indicating the distance to the point at which yielding is possible and indicating that yielding is scheduled and/or an image and text indicating the distance to the point at which the road widens and indicating that the road is going to widen.

The decision unit 110 may determine whether or not the risk condition is satisfied (S440). When the decision unit 110 decides that the road condition, the approach condition, the intention condition, and the risk condition are satisfied, the display unit 120 may determine the third content to be the target content (S450). Here, the third content includes text and an image indicating that the oncoming vehicle is present at a certain distance from the ego vehicle and/or text and an image indicating that a continuous curve is present ahead.

The decision unit 110 may determine whether or not the rear vehicle is attempting to overtake (S460). When the decision unit 110 decides that the rear vehicle is attempting to overtake, the display unit 120 may determine the fourth content to be the target content (S470).

The display unit 120 may display the determined target content on the screen (S480). Here, the display unit 120 may display different pieces of content on the interior screen 122 and the rear exterior screen 124. For example, the display unit 120 may display the third content on the rear exterior screen 124 and the fourth content on the interior screen 122. Here, the fourth content includes an image and text for informing that the rear vehicle is overtaking and text for informing the control state of the ego vehicle.

Figure 5:
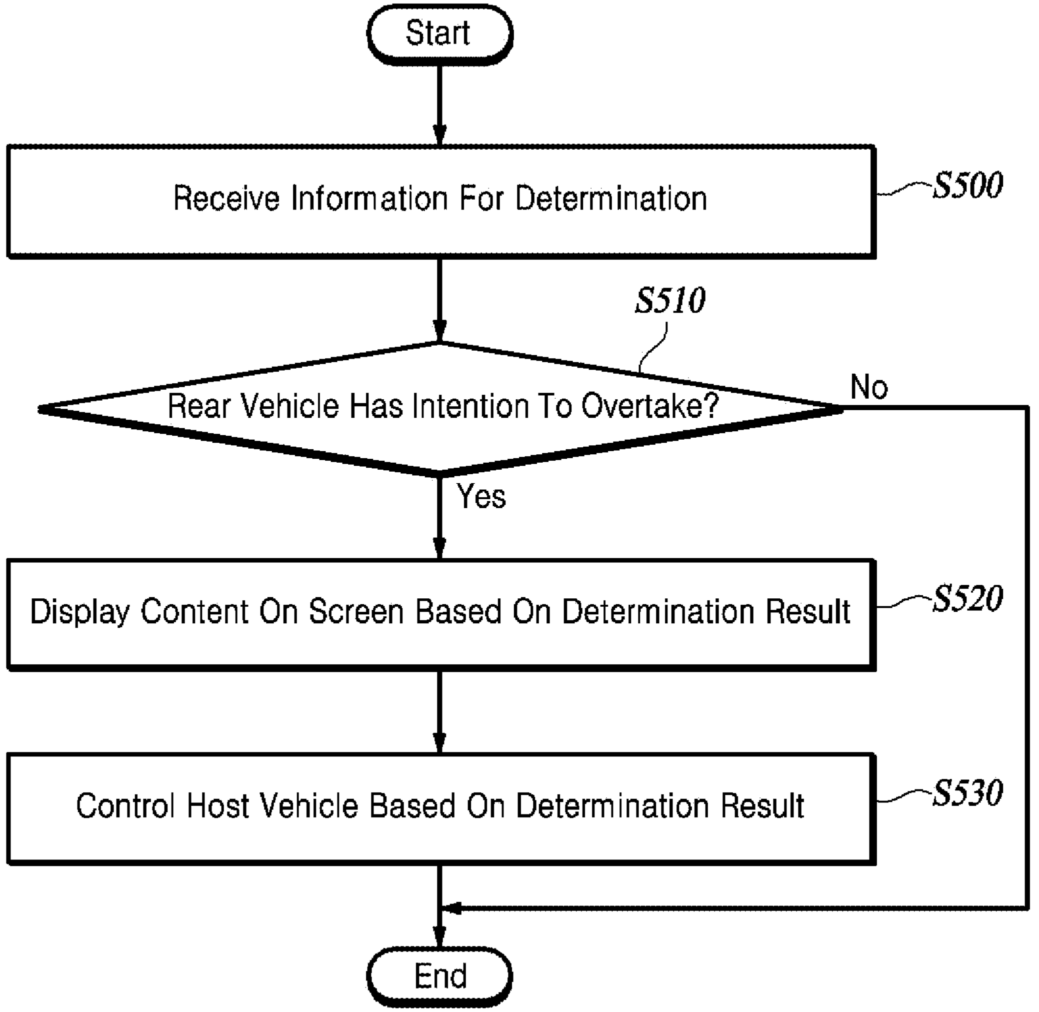
FIG. 5 is a flowchart illustrating a vehicle control method according to an embodiment of the present disclosure.

FIG. 5 is a flowchart illustrating a vehicle control method according to an embodiment of the present disclosure.

Referring to FIG. 5, the reception unit 100 may receive information for determination from a sensor, a server, or the like (S500). The information for determination may include sensor information, a high definition map, GPS signals, and the like.

The decision unit 110 may determine whether or not the rear vehicle has an intention to overtake on the basis of the information for decision (S510). The decision unit 110 may determine whether or not the rear vehicle has the intention to overtake on the basis of whether or not the overtaking condition is satisfied, whether or not yielding is possible, whether or not there is an oncoming vehicle, and whether or not the rear vehicle attempts to overtake.

The display unit 120 may determine the target content on the basis of the determination result and display the target content on the interior screen 122 and the rear exterior screen 124 (S520). The content displayed on the interior screen 122 and the rear exterior screen 124 may be different.

The vehicle control unit 130 may control the ego vehicle on the basis of the decision of the decision unit 110 (S530). The vehicle control unit 130 may decelerate the ego vehicle when the rear vehicle attempts to overtake. The vehicle control unit 130 may change the lane when the ego vehicle reaches the point at which the yielding is possible. The vehicle control unit 130 may accelerate the ego vehicle when the rear vehicle does not intend to overtake.

Figure 6:
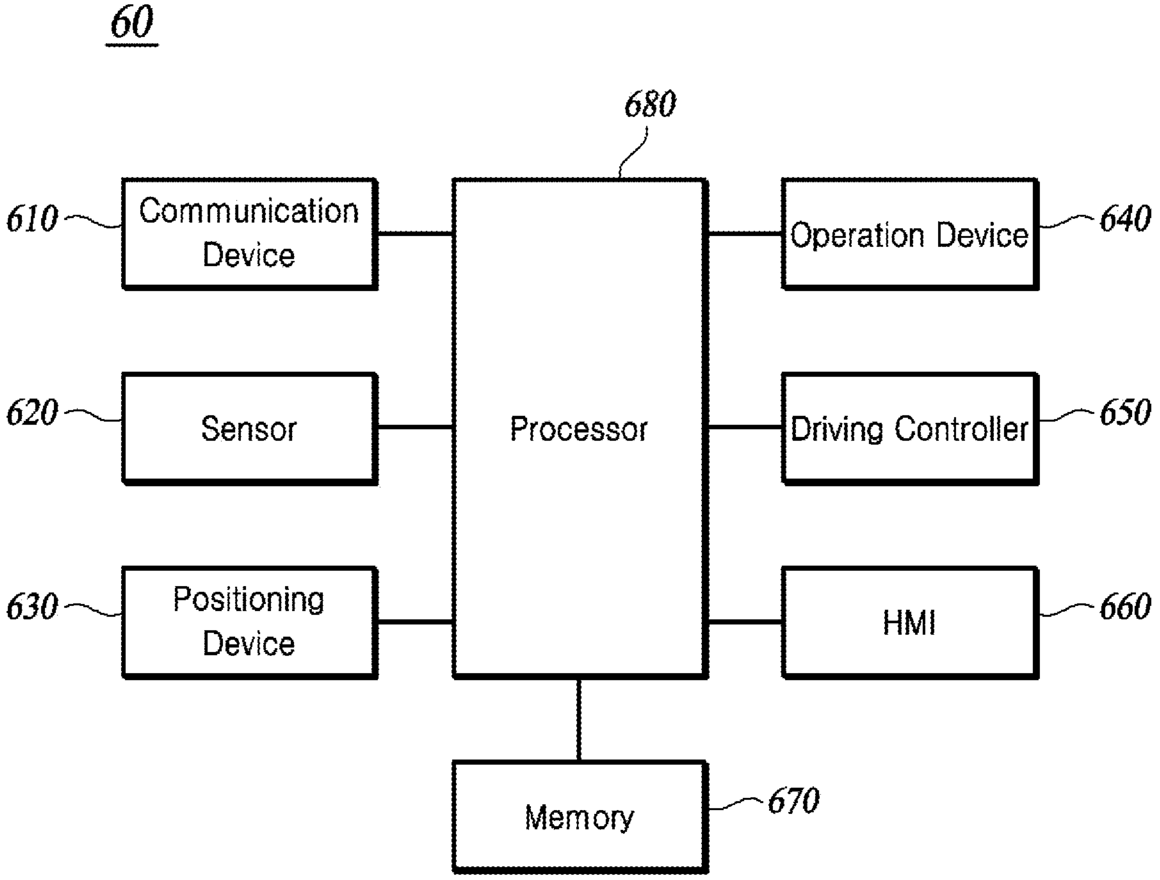
FIG. 6 is a block diagram schematically illustrating an example vehicle that can be used to implement the method or device according to embodiments of the present disclosure.

FIG. 6 is a block diagram schematically illustrating an example vehicle that can be used to implement the method or device according to embodiments of the present disclosure.

The vehicle 60 may include at least one of a communication device 610, a sensor 620, a positioning device 630, an operation device 640, a driving controller 650, a human machine interface unit (HMI) 660, a memory 670, and a controller or processor 680. The vehicle 60 may include a vehicle control device 10 structurally and/or functionally.

The communication device 610 may exchange signals with devices positioned outside and inside the vehicle 60. The communication device 610 may exchange a signal with at least one of an infrastructure device such as a server or a base station, another vehicle, and a terminal. The communication device 610 may include at least one of a transmission antenna, a reception antenna, a radio frequency (RF) circuit capable of implementing various communication protocols, and an RF element to perform communication. The communication device 610 may include an internal communication part and an external communication part. The internal communication part may transmit or receive signals using various communication protocols present in the vehicle 60. In this regard, an internal communication protocol may include at least one of a controller area network (CAN), a CAN with flexible data rate (CAN FD), ethernet, local interconnect network (LIN), and FlexRay. The communication protocol may include other protocols for performing communication between various devices mounted on the vehicle. The external communication part may perform communication with other vehicles, an infrastructure system, a base station, or a roadside device using various communication protocols. In this regard, the external communication protocol may include vehicle-to-everything (V2X) communication including vehicle-to-vehicle (V2V) communication, vehicle-to-infrastructure (V2I) communication, vehicle-to-network (V2N) communication, and vehicle-to-pedestrian (V2P) communication. The infrastructure may be, for example, a roadside unit or server that periodically transmits traffic information in conjunction with a transportation information system (TIS) or an intelligent transport system (ITS).

The sensor 620 may sense the state of the vehicle 60 and an external object.

In order to sense the state of the vehicle 60, the sensor 620 may include at least one of an inertial measurement unit (IMU), a distance measuring instrument (DMI), a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, and a pedal position sensor. On the other hand, the IMU sensor may include one or more of an acceleration sensor, a gyro sensor, and a magnetic sensor. The sensor 620 may generate state data of the vehicle, based on a signal generated from at least one sensor. For example, direction information such as the heading and yaw rate of the vehicle 60 may be collected by the sensor 620.

In order to sense the external object, the sensor 620 may include at least one of a camera, a radar sensor, a light detection and ranging (LiDAR) sensor, an ultrasonic sensor, and an infrared sensor. The sensor 620 may measure at least one of information about the presence or absence of an object, information about a position of an object, information about a distance between the vehicle 60 and an object, and information about relative speed between the vehicle 60 and an object.

The positioning device 630 may generate position data of the vehicle 60. The positioning device 630 may include at least one of a global positioning system (GPS), a differential global positioning system (DGPS), or a global navigation satellite system (GNSS). The positioning device 630 may generate the position data of the vehicle 60 based on a signal generated from at least one of the GPS, the DGPS, or the GNSS. The positioning device 630 may estimate the position of the vehicle 60 based on wireless signals received from the communication device 610. The positioning device 630 may estimate the current position of the vehicle 60 based on the previous position, travel distance information, moving time information, speed information, or acceleration information of the vehicle 60 using the IMU or DMI. Meanwhile, the processor 680 may estimate the path history and path prediction of the vehicle 60 based on the position information of the vehicle 60 collected by the positioning device 630.

The operation device 640 receives a user input for driving. In a manual mode, the vehicle 60 may be driven based on a signal provided by the operation device 640. The operation device 640 may include a steering input device such as a steering wheel, an acceleration input device such as an accelerator pedal, and a brake input device such as a brake pedal.

The driving controller 650 is a device that electrically controls various vehicle driving devices in the vehicle 60. The driving controller 650 may include a power train driving control device, a chassis driving control device, a door/window driving control device, a safety device driving control device, a lamp driving control device, and an air conditioning driving control device. The driving controller 650 controls the movement of the vehicle 60 based on the input signal of the operation device 640 or the control signal of the processor 680.

The HMI 660 is a device for communication between the vehicle 60 and a human (e.g., an occupant of the vehicle 60 or other vehicle). The HMI 660 may receive a user input and provide information generated in the vehicle 60 to the user. The vehicle 60 may implement a user interface (UI) or user experience (UX) through the HMI 660. The HMI 660 may include an input device such as a touch panel or a microphone, and the HMI 660 may include an output device such as a display device or a speaker. For example, the HMI 660 may include an interior display that outputs a screen toward the inside of the vehicle 60 and/or an exterior display that outputs a screen toward the outside of the vehicle.

The memory 670 may store a program that causes the processor 680 to perform a method according to an embodiment of the present disclosure. For example, the program may include a plurality of instructions executable by the processor, and the method according to an embodiment of the present disclosure may be performed by executing the plurality of instructions by the processor.

The memory 670 may be a single memory or a plurality of memories. When the memory 670 is formed of the plurality of memories, the plurality of memories may be physically separated. The memory 670 may include at least one of a volatile memory and a non-volatile memory. The volatile memory includes a static random access memory (SRAM) or a dynamic random access memory (DRAM), while the non-volatile memory includes a flash memory.

The memory 670 may store map information. The map information may be a navigation map and/or a high definition map (HD map). The HD map may be received from an external device or stored in advance. The navigation map includes a node indicating a point where at least two roads meet and a link connecting two nodes. The navigation map may include geographic information, road information, lane information, building information, or signal information.

The HD map incorporates more specific data compared to the navigation map. The ADAS map may include road gradient, road curvature, or sign information, based on a road. The HD map may include lane information, lane boundary information, stop line position, traffic light position, signal sequence, or intersection information, based on a lane. The HD map may include basic road information, surrounding environment information, detailed road environment information, or dynamic road condition information. The detailed road environment information may include static information such as elevation of terrain, curvature, lane, lane centerline, regulation line, road boundary, road centerline, traffic sign, road surface sign, shape and height of the road, lane width, and the like. The dynamic road condition information may include traffic congestion, an accident section, a construction section, and the like. The HD map may include road surrounding environment information implemented in 3D, geometric information such as road shape or facility structure, and semantic information such as traffic signs or lane marks.

The processor 680 may include at least one core capable of executing at least one command. The processor 680 may execute the instructions stored in the memory 670. The processor 680 may be a single processor or a plurality of processors.

Each component of the apparatus or method according to embodiments of the present disclosure may be implemented as hardware or software or as a combination of hardware and software. Furthermore, the function of each component may be implemented as software and a microprocessor may be implemented to execute the function of the software corresponding to each component.

Various implementations of systems and techniques described herein may be realized as digital electronic circuits, integrated circuits, field programmable gate arrays (FPGAs), application-specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications, or codes) contain commands for a programmable processor and are stored in a "computer-readable recording medium."

The computer-readable recording medium includes all types of recording devices in which data readable by a computer system is stored. Such a computer-readable recording medium may be a non-volatile or non-transitory medium, such as a read-only memory (ROM), a compact disk ROM (CD-ROM), a magnetic tape, a floppy disk, a memory card, a hard disk, a magneto-optical disk, or a storage device, and it may further include a transitory medium such as a data transmission medium. In addition, the computer-readable recording medium may be distributed in a computer system connected via a network, so that computer-readable codes may be stored and executed in a distributed manner.

The flowchart/timing diagrams of the present specification describe that processes are sequentially executed, but this is merely illustrative of technical ideas of embodiments of the present disclosure. In other words, since it is apparent to those having ordinary skill in the art that an order described in the flowchart/timing diagrams may be changed or one or more processes may be executed in parallel without departing from the essential characteristics of embodiments of the present disclosure, the flowchart/timing diagrams are not limited to a time-series order.

Although exemplary embodiments of the present disclosure have been described for illustrative purposes, those having ordinary skill in the art should appreciate that various modifications, additions, and substitutions are possible, without departing from the idea and scope of the claimed disclosure. Therefore, exemplary embodiments of the present disclosure have been described for the sake of brevity and clarity. The scope of the technical idea of the present embodiments is not limited by the illustrations. Accordingly, one of ordinary skill in the art would understand that the scope of the claimed disclosure is not to be limited by the above explicitly described embodiments but by the claims and equivalents thereof.

What is claimed is:

1. A vehicle control device comprising:
one or more processors; and
a non-transitory storage device storing a program to be executed by the one or more processors, the program including instructions to:
receive information;
determine, based on the received information, whether an overtaking condition is satisfied, whether yielding is possible, whether there is an oncoming vehicle, whether there is a curved road ahead, or whether a rear vehicle attempts to overtake a vehicle;
obtain a determination result that indicates whether the overtaking condition is satisfied, whether yielding is possible, whether there is an oncoming vehicle, whether there is a curved road ahead, or whether the rear vehicle attempts to overtake the vehicle;
control a display device to output content, which is determined based on the determination result, that indicates a front situation and a vehicle control state to the rear vehicle and an occupant of the vehicle,
wherein in response to the determination result indicating that the overtaking condition is satisfied and yielding is possible, the output content includes first content indicating a location ahead where yielding by the vehicle or overtaking by the rear vehicle is facilitated, and
wherein in response to the determination result indicating that the overtaking condition is satisfied and there is an oncoming vehicle or there is a curved road ahead, the output content includes second content indicating that overtaking by the rear vehicle has a risk; and
control a maneuver of the vehicle based on the determination result.

2. The vehicle control device of claim 1, wherein the overtaking condition comprises a road condition including whether a road on which the vehicle is traveling requires overtaking by the rear vehicle for moving ahead of the vehicle.

3. The vehicle control device of claim 2, wherein the overtaking condition further comprises an approach condition including whether the rear vehicle has maintained a first predefined distance from the vehicle for a predefined time period or whether the rear vehicle has activated an emergency light, a siren, or high beams.

4. The vehicle control device of claim 3, wherein the program further includes instructions to control the display device to output third content indicating a current speed of the vehicle or a speed limit of the road in response to the determination result indicating that the road condition and the approach condition are satisfied.

5. The vehicle control device of claim 3, wherein the overtaking condition further comprises an intention condition including whether the rear vehicle performs biased traveling or whether the rear vehicle accelerates.

6. The vehicle control device of claim 5, wherein the program further includes instructions to control the display device to output the first content in response to the determination result indicating that the road condition, the approach condition, and the intention condition are satisfied and yielding is possible.

7. The vehicle control device of claim 6, wherein the overtaking condition further comprises a risk condition including whether the oncoming vehicle is present within a second predefined distance from the vehicle or whether there is a curved road satisfying a specific condition.

8. The vehicle control device of claim 7, wherein the program further includes instructions to control the display device to output the second content in response to the determination result indicating that the road condition, the approach condition, the intention condition, and the risk condition are satisfied.

9. The vehicle control device of claim 7, wherein the program further includes instructions to control the display device to output the second content, third content indicating that the rear vehicle is overtaking, or both the second content and the third content in response to the determination result indicating that the road condition, the approach condition, the intention condition, and the risk condition are satisfied and the rear vehicle attempts to overtake the vehicle.

10. The vehicle control device of claim 1, wherein:

the display device comprises an interior display within the vehicle and an exterior display facing outside the vehicle; and the program further includes instructions to control the interior display and the exterior display to output different pieces of text, different images, or different pieces of content.

11. The vehicle control device of claim 1, wherein the program further includes instructions to control the vehicle to decelerate in response to the determination result indicating that the rear vehicle attempts to overtake the vehicle.

12. The vehicle control device of claim 1, wherein:

the received information comprises a map and a location of the vehicle; and the program further includes instructions to:

determine whether yielding is possible based on the map and the location; and control the vehicle to change lanes in response to the determination result indicating that yielding is possible.

13. A method of controlling a vehicle by a vehicle control device, the method comprising:

receiving information;

determining, based on the received information, whether an overtaking condition is satisfied, whether yielding is possible, whether there is an oncoming vehicle, whether there is a curved road ahead, or whether a rear vehicle attempts to overtake the vehicle;

obtaining a determination result that indicates whether the overtaking condition is satisfied, whether yielding is possible, whether there is an oncoming vehicle, whether there is a curved road ahead, or whether the rear vehicle attempts to overtake the vehicle;

displaying content, which is determined based on the determination result, that indicates a front situation and a vehicle control state to the rear vehicle and an occupant of the vehicle on a display device, wherein in response to the determination result indicating that the overtaking condition is satisfied and yielding is possible, the content includes first content indicating a location ahead where yielding by the vehicle or overtaking by the rear vehicle is facilitated, and wherein in response to the determination result indicating that the overtaking condition is satisfied and there is an oncoming vehicle or there is a curved road ahead, the content includes second content indicating that overtaking by the rear vehicle has a risk; and controlling the vehicle based on the determination result.

14. The method of claim 13, wherein the overtaking condition comprises:

a road condition including whether a road that the vehicle is traveling on requires overtaking;

an approach condition including whether the rear vehicle has maintained a predefined distance from the vehicle for a predefined time period or whether the rear vehicle has activated an emergency light, a siren, or high beams;

an intention condition including whether the rear vehicle performs biased traveling or whether the rear vehicle accelerates; or a risk condition including whether the oncoming vehicle is present within a specific distance from the vehicle or whether there is a curved road satisfying a specific condition.

15. The method of claim 14, wherein displaying the content comprises displaying third content on the display device indicating a speed of the vehicle in response to the determination result indicating that the road condition and the approach condition are satisfied.

16. The method of claim 14, wherein displaying the content comprises displaying the first content on the display device in response to the determination result indicating that the road condition, the approach condition, and the intention condition are satisfied.

17. The method of claim 14, wherein displaying the content comprises displaying the second content on the display device in response to the determination result indicating that the road condition, the approach condition, the intention condition, and the risk condition are satisfied.

18. The method of claim 14, wherein displaying the content comprises displaying the second content, displaying third content on the display device indicating that the rear vehicle is overtaking, or displaying both the second content and the third content on the display device in response to the determination result indicating that the road condition, the approach condition, the intention condition, and the risk condition are satisfied and the rear vehicle attempts to overtake the vehicle.

19. The method of claim 13, wherein:

the display device comprises an interior screen and a rear exterior screen; and displaying the content comprises displaying different pieces of text, different images, or different pieces of content on the interior screen and the rear exterior screen.

20. A method of controlling a vehicle by a vehicle control device, the method comprising:

receiving information, wherein the received information comprises a map and a location of the vehicle;

determining, based on the received information, whether an overtaking condition is satisfied, whether yielding is possible, whether there is an oncoming vehicle, whether there is a curved road ahead, or whether a rear vehicle attempts to overtake the vehicle, wherein determining whether yielding is possible comprises determining whether yielding is possible based on the map and the location;

obtaining a determination result that indicates whether the overtaking condition is satisfied, whether yielding is possible, whether there is an oncoming vehicle, whether there is a curved road ahead, or whether the rear vehicle attempts to overtake the vehicle;

displaying content, which is determined based on the determination result, that indicates a front situation and a vehicle control state to the rear vehicle and an occupant of the vehicle on a display device, wherein in response to the determination result indicating that the overtaking condition is satisfied and yielding is possible, the content includes first content indicating a location ahead where yielding by the vehicle or overtaking by the rear vehicle is facilitated, and wherein in response to the determination result indicating that the overtaking condition is satisfied and there is an oncoming vehicle or there is a curved road ahead, the content includes second content indicating that overtaking by the rear vehicle has a risk; and controlling the vehicle, based on the determination result, comprises controlling the vehicle to change lanes in response to the determination result indicating that yielding is possible.

* * * * *